United States Patent [19]

Niedzielski et al.

[11] Patent Number: 4,903,511
[45] Date of Patent: Feb. 27, 1990

[54] ANTI-THEFT STEERING SHAFT LOCK

[75] Inventors: Donald A. Niedzielski, Bay City; Indulis Piziks, Saginaw; Dantar P. Oosterwal, Grand Blanc, all of Mich.

[73] Assignee: General Motors Corporation, Detroit, Mich.

[21] Appl. No.: 370,960

[22] Filed: Jun. 26, 1989

[51] Int. Cl.[4] .............................................. B60R 25/02
[52] U.S. Cl. ......................................... 70/252; 70/184
[58] Field of Search ................. 70/252, 184, 185, 186; 74/484 R, 548

[56] References Cited

U.S. PATENT DOCUMENTS

| | | | |
|---|---|---|---|
| 1,341,281 | 5/1920 | Randolph. | |
| 1,381,000 | 6/1921 | Mueller. | |
| 1,487,863 | 3/1924 | Lavigne. | |
| 3,566,633 | 3/1971 | Borck | 70/252 |
| 3,566,634 | 3/1971 | Borck | 70/252 |
| 3,732,710 | 5/1973 | Rhodes et al. | 70/239 |
| 4,552,000 | 11/1985 | Lipschutz | 70/185 |
| 4,559,795 | 12/1985 | Zagoroff | 70/422 |
| 4,570,468 | 2/1986 | Bemm et al. | 70/252 |
| 4,750,380 | 6/1988 | Hoblingre et al. | 74/556 |

Primary Examiner—Robert L. Wolfe
Attorney, Agent, or Firm—Saul Schwartz

[57] ABSTRACT

An anti-theft steering shaft lock having a lost motion connection between the steering shaft and a stationary lock keeper on the steering column to dissipate restoring torque on the steering shaft after the driver locks the steering shaft so that subsequent withdrawal of a lock bolt from the lock keeper is not impeded. The lost motion connection includes a lost motion sleeve slidably and rotatably supported on the steering shaft and carrying the lock bolt thereon, a drive pin on the steering shaft received in a V-shaped notch in an end of the lost motion sleeve, a relatively low rate spring biasing the lost motion sleeve against the pin, and a relatively high rate spring which is engaged by the lost motion sleeve after a predetermined angular interval of relative rotation between the steering shaft and the lost motion sleeve to effectively prevent further relative rotation and thereby render the shaft unsteerable.

7 Claims, 2 Drawing Sheets

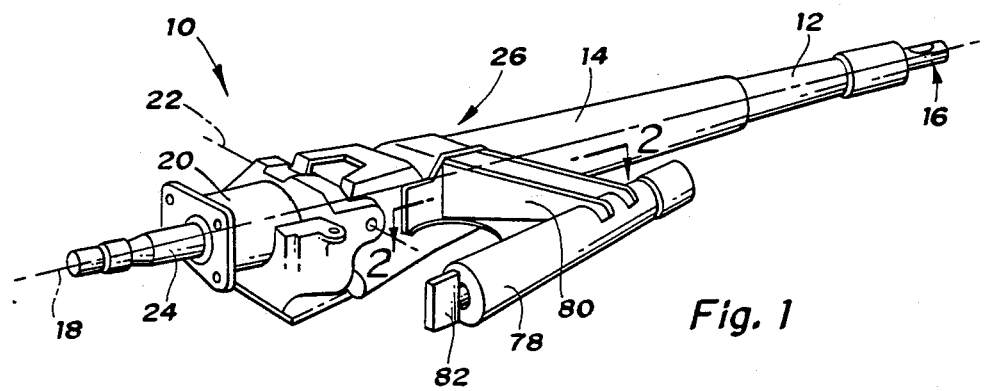
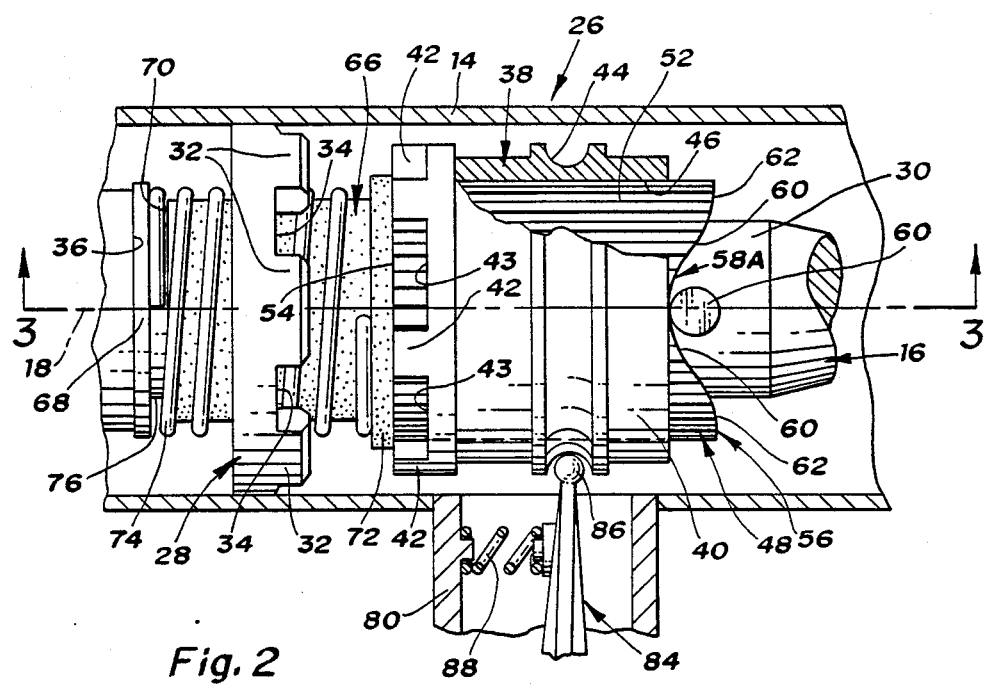

ANTI-THEFT STEERING SHAFT LOCK

FIELD OF THE INVENTION

This invention relates to anti-theft steering shaft locks on automotive steering columns.

BACKGROUND OF THE INVENTION

Common anti-theft steering shaft locks include a shiftable bolt on one of the steering shaft and the steering column and a keeper on the other which receives the bolt to inhibit rotation of the steering shaft. In some common locks, friction between the bolt and the keeper resulting from residual torque on the steering shaft may inhibit unlocking withdrawal of the bolt from the keeper. Such residual torque may, for example, result from parking the vehicle with a front tire pressing against a curb. An anti-theft steering shaft lock according to this invention incorporates a lost motion connection between the steering shaft and the one of the keeper and bolt thereon to relieve residual torque on the steering shaft after the bolt engages the keeper and thereby facilitate subsequent unlocking withdrawal of the bolt from the keeper.

BRIEF SUMMARY OF THE INVENTION

This invention is a new and improved anti-theft steering shaft lock on an automotive steering column. The anti-theft steering shaft lock according to this invention includes a lost motion sleeve on the steering shaft disposed between the shaft and the one of the bolt and keeper thereon and means to limit unrestricted rotation of the sleeve relative to the steering shaft to an included angle large enough to relieve usual residual torque on the steering shaft but small enough to render the vehicle effectively unsteerable. In a first preferred embodiment, the keeper is a first dog clutch ring on the steering column around the steering shaft and the bolt is a second dog clutch ring on the lost motion sleeve on the steering shaft, the second dog clutch ring being slidable into and out of engagement with the first ring by a fork lever. In a second preferred embodiment, the keeper is a slotted barrel on the lost motion sleeve on the steering shaft and the bolt is a radially shiftable bar on the steering column projected into and out of engagement with the slots in the barrel. In both of the preferred embodiments, the steering shaft has a drive pin thereon received in a notch in an annular end wall of the lost motion sleeve such that relative rotation between the sleeve and the steering shaft effects concurrent axial displacement of the sleeve along the steering shaft. A high rate spring is disposed between the steering shaft and the lost motion sleeve thereon which spring effectively limits relative rotation between the sleeve and the steering shaft to a predetermined included angle by exerting a very high force on the sleeve in the direction of the axis of the steering shaft. A relative low rate spring may be provided between the steering shaft and the lost motion sleeve for centering the drive pin in the notch when the steering shaft is unlocked.

BRIEF DESCRIPTION OF THE DRAWINGS

FIG. 1 is a perspective view of an automobile steering column having an anti-theft steering shaft lock according to this invention;

FIG. 2 is an enlarged partially broken-away view taken generally along the plane indicated by lines 2—2 in FIG. 1;

DESCRIPTION OF THE PREFERRED EMBODIMENT

Figure 3:
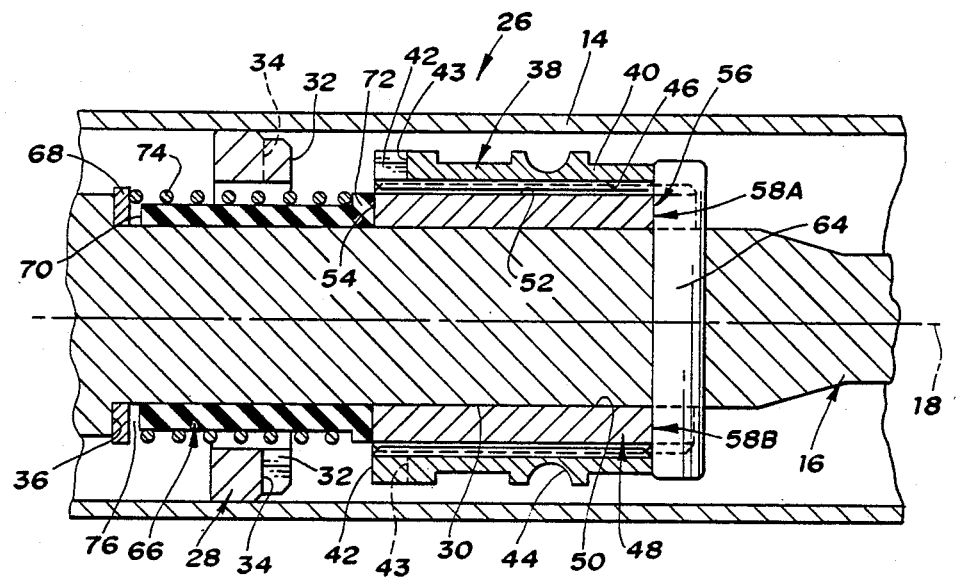
FIG. 3 is a sectional view taken generally along the plane indicated by lines 3—3 in FIG. 2.

Referring to FIG. 1, an automobile steering column 10 includes a lower mast jacket 12 and an upper mast jacket 14 telescopically overlapping the lower mast jacket. The lower end of the lower mast jacket is adapted for attachment to an automobile body panel, not shown, defining the front of the passenger compartment of the vehicle. An energy absorber, not shown, may be disposed between the upper and lower mast jackets to absorb energy during relative telescopic collapse between the mast jackets. A lower steering shaft 16 is supported in the upper and lower mast jackets 14 and 12 for rotation about a longitudinal axis 18 of the steering column.

The steering column 10 further includes a tilt housing 20 supported on the upper end of the upper mast jacket 14 for pivotal movement about a lateral axis 22 of the steering column. An upper steering shaft 24 is rotatably supported on the tilt housing 20 and connected to the lower steering shaft 16 by a conventional universal joint, not shown, centered at the intersection of the axes 18 and 22. The distal end of the upper steering shaft 24 carries a steering wheel, not shown, and the lower end of the lower steering shaft is connected to a steering gear, not shown, whereby a driver steers the vehicle in the usual fashion. In addition, control means, not shown, permit the driver to selectively position and retain the tilt housing and the steering wheel at a comfortable angle. An anti-theft steering shaft lock 26 according to this invention is provided on the steering column 10 generally at the upper end of the upper mast jacket 14.

The anti-theft steering shaft lock 26 includes a first lock element or keeper in the form of an annular first dog clutch element 28 inside and rigidly attached to the upper mast jacket 14. The dog clutch element 28 is aligned on the axis 18 around a cylindrical segment 30 of the lower steering shaft and includes a plurality of axially extending teeth 32 defining a corresponding plurality of recesses 34 therebetween, FIG. 2. The cylindrical segment 30 of the lower steering shaft terminates at an annular shoulder 36.

The anti-theft steering shaft lock 26 further includes a second lock element or bolt in the form of a cylindrical second dog clutch element 38 surrounding the lower steering shaft 16. The second dog clutch element includes a cylindrical body 40 having a plurality of axially extending teeth 42 at its left end, FIGS. 2 and 3, defining a corresponding plurality of recesses 43 therebetween. The cylindrical body 40 has an outside groove 44 therearound and an axially spline-grooved inside wall 46.

A cylindrical lost motion sleeve 48 of the steering shaft lock 26 has an inside wall 50, FIG. 2, slidably received on the cylindrical segment 30 of the lower steering shaft 16 such that the sleeve is both rotatable and axially slidable relative to the lower steering shaft. The sleeve 48 has a spline-grooved outside wall 52 inside the spline-grooved inside wall 46 of the second dog clutch element 38 such that the element 38 is axially slidable relative to the sleeve and rotatable as a unit therewith.

The lost motion sleeve 48 has a an uninterrupted first annular end wall 54 and a second annular end wall 56 in which are defined a pair of identical, diametrically opposite, generally V-shaped notches 58A–B. Describing only notch 58A, its sides are symmetrical and each includes a relatively steep part 60 and a relatively shallow upper part 62 at the top of the notch. A drive pin 64 is rigidly mounted on the lower steering shaft 16 transverse to the axis 18 and has opposite ends received in respective ones of the notches 58A–B. Relative rotation in either direction between the sleeve 48 and the lower steering shaft 16 effects concurrent axial movement of the sleeve toward the shoulder 36 on the shaft due to the interaction of the sides of notches 58A–B and the drive pin 64.

As seen best in FIGS. 2 and 3, an elastomeric sleeve 66 is disposed around the cylindrical part 30 of the lower steering shaft 16 between the lost motion sleeve 48 and a washer 68 adjacent the annular shoulder 36 on the lower steering shaft 16. The elastomeric sleeve has an annular end wall 70 facing the washer 68 and a flange 72 at the other end facing the annular end wall 54 of the lost motion sleeve 48. A relatively low rate coil spring 74 is disposed around the elastomeric sleeve 66 and seats at one end against the flange 72 and at the other end against the washer 68. The coil spring 74 biases the elastomeric sleeve against the lost motion sleeve 48 and the latter against the drive pin 64 such that the drive pin is centered in the notches 58A–B, FIGS. 2–3. In that condition, a gap 76, FIG. 3, is defined between the end wall 70 of the elastomeric sleeve 66 and the washer 68. The axial extent of the gap 76 corresponds to the axial extent of the steep part 60 of the sides of notches 58A–B in the lost motion sleeve 48.

As seen best in FIGS. 1 and 2, the anti-theft steering shaft lock 26 further includes a cylindrical lock housing 78 rigidly connected to the upper mast jacket 14 by a brace 80. A conventional cylinder lock, not shown, is disposed within the lock housing and controlled by a key 82 inserted in and withdrawn from the cylinder lock through a key slot accessible by the driver. The cylinder lock is preferably connected to an ignition switch, not shown, and has the usual lock, off, start and run positions corresponding to the various states of the vehicle's ignition. The cylinder lock also operates a lateral shift lever 84, FIG. 2, pivotally supported in the brace 80. The shift lever 84 has an operating end 86 lodged in the groove 44 on the second dog clutch element 38 such that when the shift lever pivots, the second dog clutch element is shifted back and forth on the lost motion sleeve 48 in the direction of longitudinal axis 18 of the steering column. A spring 88 biases the shift lever to the right, FIG. 2, and assists coil spring 74 in locating the drive pin 64 in the bottom of the notches 58A–B.

The second dog clutch element 38 has a locked position, not shown, corresponding to the lock position of the cylinder lock wherein the teeth 32 and 42 on the first and second dog clutch elements engage the recesses 43 and 34, respectively, so that the second dog clutch element 38 is rigidly coupled to the lower mast jacket. The second dog clutch element also has an unlocked position, FIGS. 2–3, corresponding to any of the off, start and run positions of the cylinder lock, remote from the first dog clutch element 28. In the unlocked position, the second dog clutch element is rotatable with the lost motion sleeve 48 and the lower steering shaft 16 about the axis 18.

The anti-theft steering shaft lock 26 operates as follows. When the vehicle is being driven, the cylinder lock is in its run position and the second dog clutch element 38 is in its unlocked position. The springs 74 and 88 bias the lost motion sleeve 48 against the drive pin 64 so that the lost motion sleeve and the second dog clutch element rotate as a unit with the steering shaft as the driver steers the vehicle normally.

As part of a usual parking maneuver with the vehicle stopped, the driver turns the key and rotates the cylinder lock to its lock position while at the same time maintaining a steady grip on the steering wheel. Concurrently, the shift lever 84 slides the second dog clutch element 38 relative to the lost motion sleeve from its unlocked to its locked position engaging the first dog clutch element 28.

Any residual or restoring torque in the steering system is released concurrently with easing of the driver's grip on the steering wheel after the key 82 is withdrawn from the cylinder lock. If the second dog clutch element were non-rotatably connected to the lower steering shaft 16, any residual or restoring torque in the steering system would press the sides of teeth 32 and 42 against each other and the resulting friction between the teeth would render it more difficult move the second dog clutch element to its unlocked position by turning the key 82.

The lost motion sleeve 48, however, defines a lost motion connection between the second dog clutch element 38 and the lower steering shaft 16. More particularly, the lower steering shaft is rotatable relative to the lost motion sleeve 48. The splines on the inside wall 46 of the second dog clutch element 38 and on the outside wall 52 of the lost motion sleeve lock the sleeve 48 against rotation relative to the upper mast jacket 14. Thus, restoring torque on the lower steering shaft 16 rotates the shaft relative to the lost motion sleeve until fully dissipated. Concurrently, the drive pin 64 interacts with the steep parts 60 of the sides of notches 58A–B to shift the loose sleeve axially against the relatively low rate springs 74 and 88.

The axial extent of the gap 76 and the steep parts of the notches 38A–B is coordinated with the amount of angular rotation of the steering shaft associated with substantially complete dissipation of usual restoring torque. Accordingly, substantially all restoring torque is dissipated before the annular end wall 70 of the elastomeric sleeve 66 engages the washer 68 and the only forces urging the sides of the dog clutch teeth 32 and 42 against each other are due to the relatively low rate springs 74 and 88. Therefore, the second dog clutch element is easily withdrawn from the first dog clutch element by rotation of the key 82.

The anti-theft steering shaft lock 26 cannot be defeated by overtorquing the steering wheel. If a thief attempts to steer with the steering shaft locked as described, rotation of the steering shaft causes the drive pin 64 to shift lost motion sleeve 48 further to the left, FIGS. 1 and 2, until the annular end wall 70 on the elastomeric sleeve 66 abuts the washer 68 just as the drive pin engages the shallow parts 62 of the sides of the notches 58A–B. Thereafter, the elastomeric sleeve 66 defines a very high rate compression spring resisting rotation of the steering shaft through the lost motion sleeve and the drive pin.

The axial extents of the shallow parts 62 are coordinated with the spring rate of the elastomeric sleeve 66 such that steering forces required to turn the steering shaft are low enough to prevent permanent damage to the anti-theft steering shaft lock but high enough to render the vehicle effectively unsteerable. That is, a thief attempting to steer the vehicle experiences angular intervals of easy steering interrupted by angular intervals of very hard or almost impossible steering as the drive pin 64 traverses the annular end wall 56 of the lost motion sleeve 48 in and out of the notches 58A-B.

Figure 4:
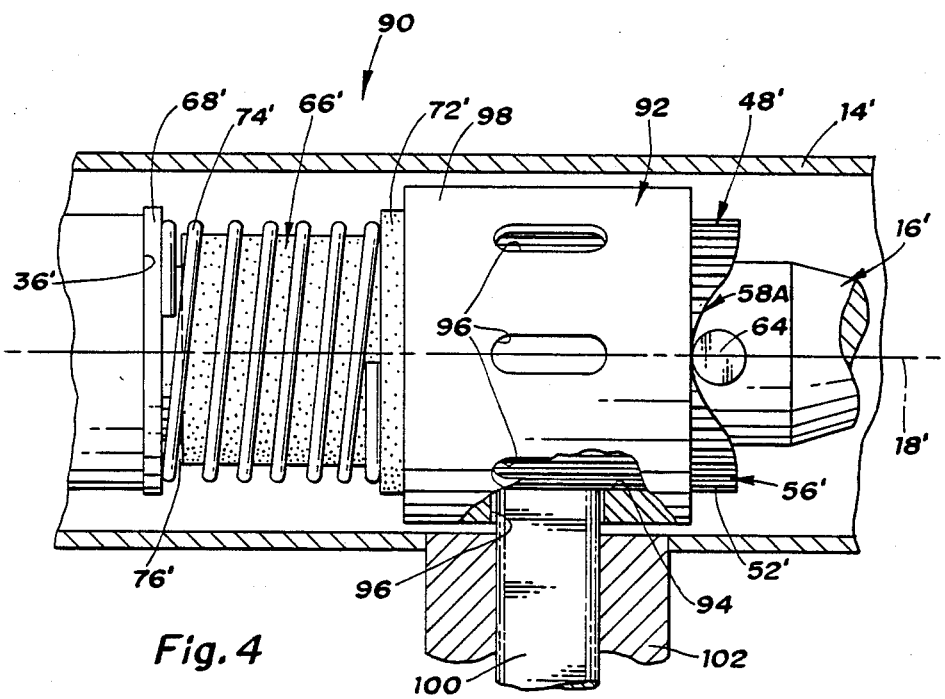
FIG. 4 is similar to FIG. 2 but showing a second preferred embodiment of the steering shaft lock according to this invention.

A modified anti-theft steering shaft lock 90 according to this invention is shown in FIG. 4 wherein elements common to the modified lock and the lock 26 described above are identified by primed reference characters. The modified lock 90 includes a keeper element in the form of a metal sleeve 92 around the lost motion sleeve 48'. The metal sleeve 92 has a splined inside wall 94 slidably engaging the splined outside wall 52' on the lost motion sleeve 48'. The metal sleeve 92 also has a plurality of keeper slots 96 in an outside wall 98 of the sleeve.

The modified lock 90 further includes a bolt element in the form of a bar 100 shiftable radially relative to the axis 18' of the steering column in a reinforced housing 102 corresponding to the brace 80 described above. The bar 100 is controlled by a key, not shown, corresponding to the key 82 and has a locked position, FIG. 4, projecting into one of the slots 96 and an unlocked position, not shown, withdrawn from the slots. In the locked position of the bar, the metal sleeve 92 is prevented from rotating relative to the upper mast jacket 14'. In the unlocked position of the bar 100, the metal sleeve 92 is rotatable as a unit with the lost motion sleeve 48' and the lower steering shaft 16'. When the bar 100 is in its locked position, the modified lock 90 operates as described above with respect to both dissipation of restoring torque and anti-theft.

The embodiments of the invention in which an exclusive property or privilege is claimed are defined as follows:

1. In an automotive steering column including a stationary part and a steering shaft rotatably supported on said stationary part,
   a steering shaft lock comprising:
   a lock bolt means including an engaging part movable between a locked position and an unlocked position,
   a lock keeper means including a receiving part adapted to receive said engaging part in said locked position of said engaging part and prevent relative movement between said lock bolt means and said lock keeper means,
   means mounting one of said lock bolt means and said lock keeper means on said stationary part of said steering column, and
   lost motion means mounting the other of said lock bolt means and said lock keeper means on said steering shaft such that said steering shaft is rotatable in substantially unrestrained fashion through a predetermined included angle relative to said other of said lock bolt means and said lock keeper means to relieve restoring torque on said steering shaft in said locked position of said lock bolt means engaging part and thereafter restrained against rotation relative to said other of said lock bolt means and said lock keeper means to render said steering shaft substantially ineffective for steering a vehicle.

2. The anti-theft steering shaft lock recited in claim 1 wherein said lost motion means includes
   a lost motion sleeve,
   means operative to mount said lost motion sleeve on said steering shaft for substantially unrestrained rotation relative to said steering shaft through said predetermined included angle and to thereafter substantially restrain rotation of said lost motion sleeve relative to said steering shaft, and
   means mounting said other of said lock bolt means and said lock keeper means on said lost motion sleeve for rotation as a unit therewith relative to said steering shaft.

3. The anti-theft steering shaft lock recited in claim 2 wherein said means operative to mount said lost motion sleeve on said steering shaft includes
   means mounting said lost motion sleeve on said steering shaft for bodily shiftable movement relative to said steering shaft in the direction of a longitudinal axis of said steering shaft concurrently with rotation of said lost motion sleeve relative to said steering shaft,
   means on said lost motion sleeve defining an annular end wall having a notch therein,
   a drive pin rigidly mounted on said steering shaft received in said notch in said annular end wall of said lost motion sleeve and operative when said shaft rotates relative to said lost motion sleeve to displace said lost motion sleeve in the direction of said longitudinal axis of said steering shaft, and
   a high rate compression spring disposed between said lost motion sleeve and said steering shaft operative to resist bodily shiftable movement of said lost motion sleeve and thereby continued rotation of said steering shaft relative to said lost motion sleeve after said relative rotation exceeds said predetermined angular interval.

4. The anti-theft steering shaft lock recited in claim 3 wherein
   said notch in said lost motion sleeve annular end wall is a substantially V-shaped notch having a steep side port and a shallow side port.

5. The anti-theft steering shaft lock recited in claim 4 and further including
   a relatively low rate spring disposed between said steering shaft and said lost motion sleeve biasing said lost motion sleeve toward said drive pin so that said drive pin is biased to a centered position in said substantially V-shaped notch.

6. The anti-theft steering shaft lock recited in claim 5 wherein
   said lock keeper means includes a first annular dog clutch element rigidly attached to said steering column stationary part, and
   said lock bolt means includes a second annular dog clutch element mounted on said lost motion sleeve for rotation as a unit therewith relative to said steering shaft and for bodily shiftable movement relative to said lost motion sleeve in the direction of said longitudinal axis of said steering shaft between said locked position engaging said first annular dog clutch element and said unlocked position remote from said first dog clutch element.

7. The anti-theft steering shaft lock recited in claim 5 wherein
   said lock keeper means is a second sleeve mounted on said lost motion sleeve for rotation as a unit therewith and for bodily shiftable movement relative thereto in the direction of said longitudinal axis of said steering shaft and including a plurality of slots, and said lock bolt means includes a bar mounted on said steering column stationary part for bodily shiftable movement generally radially relative to said longitudinal axis of said steering shaft between said locked position engaging said slots on said second sleeve and said unlocked position remote from said second sleeve.

* * * * *